Patented Nov. 6, 1934

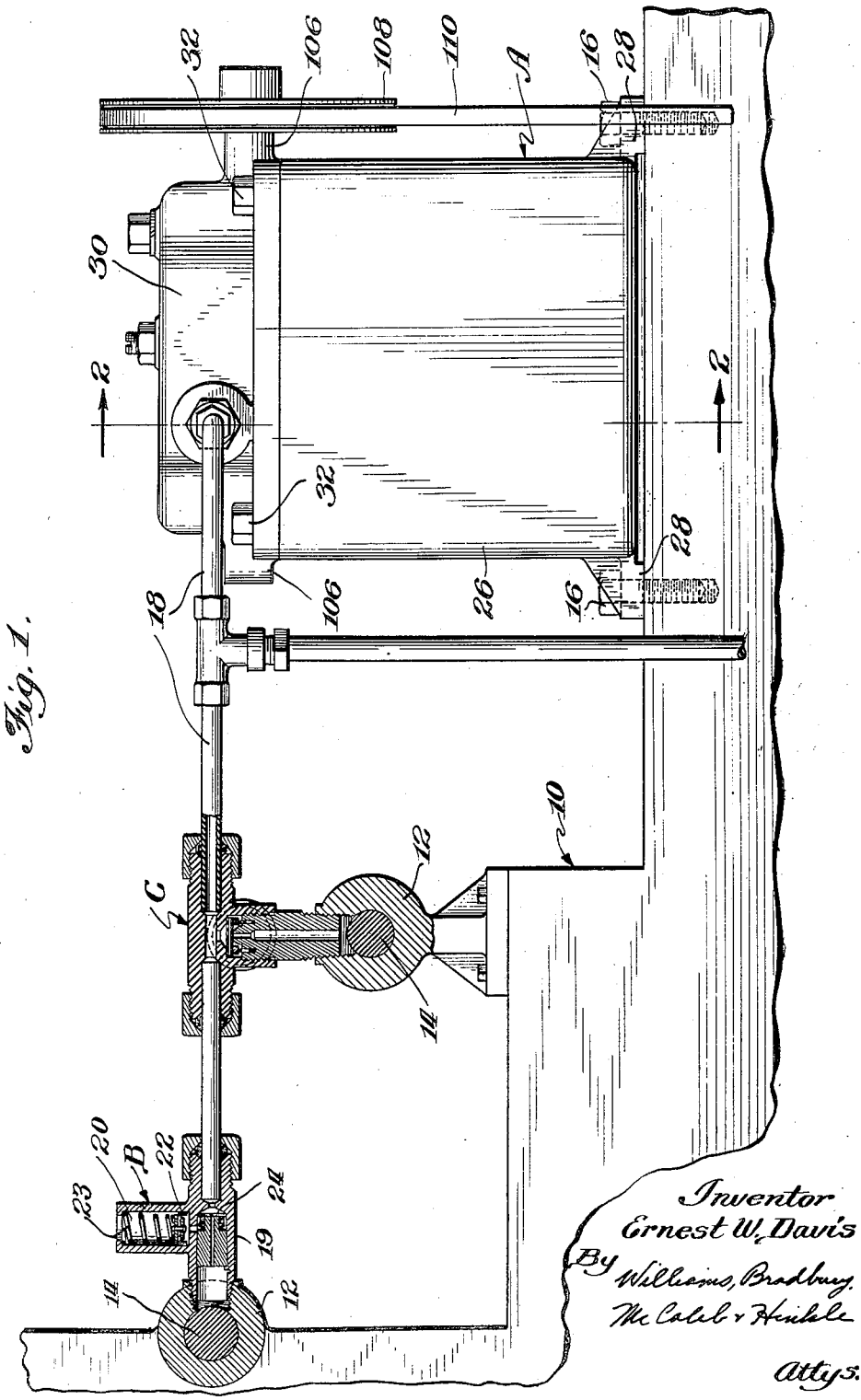

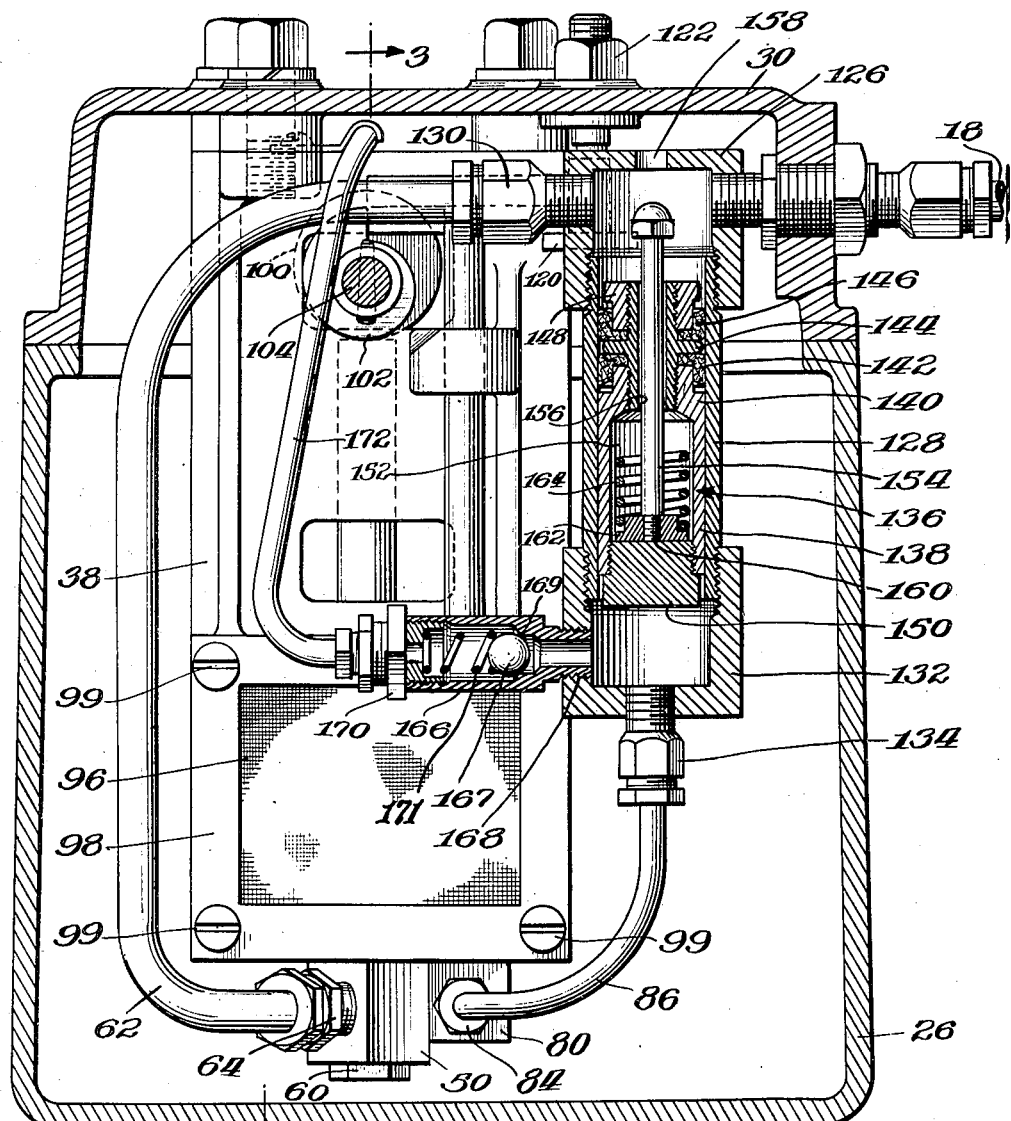

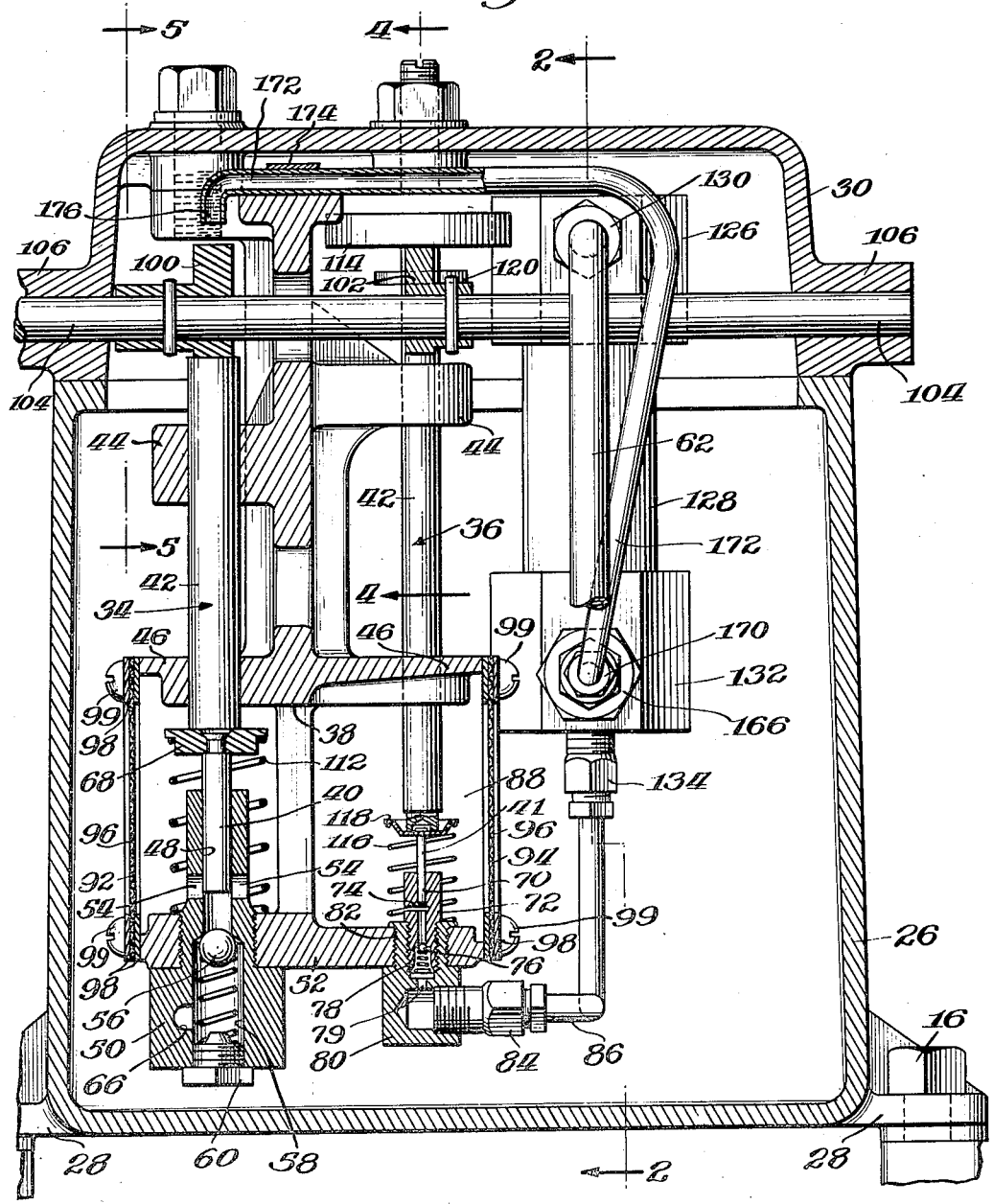

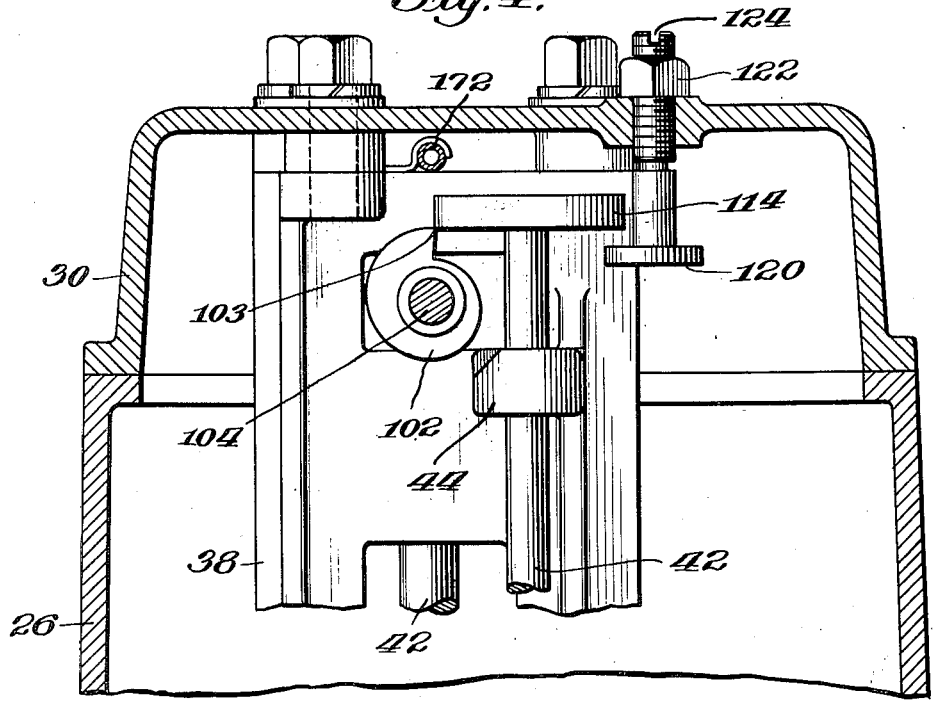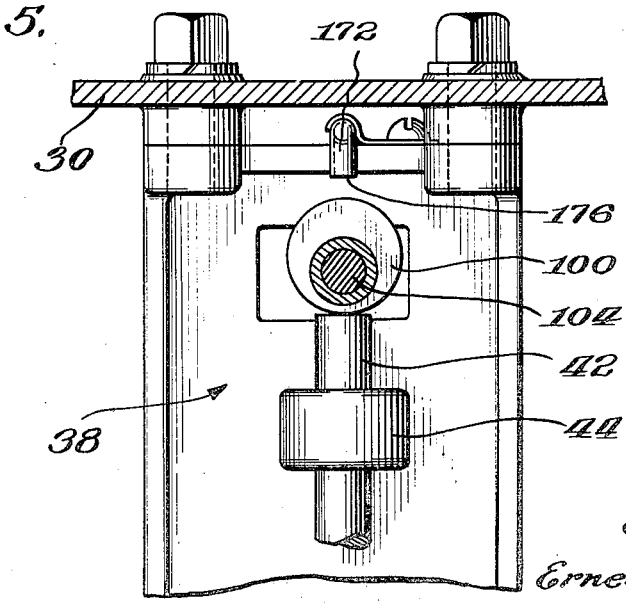

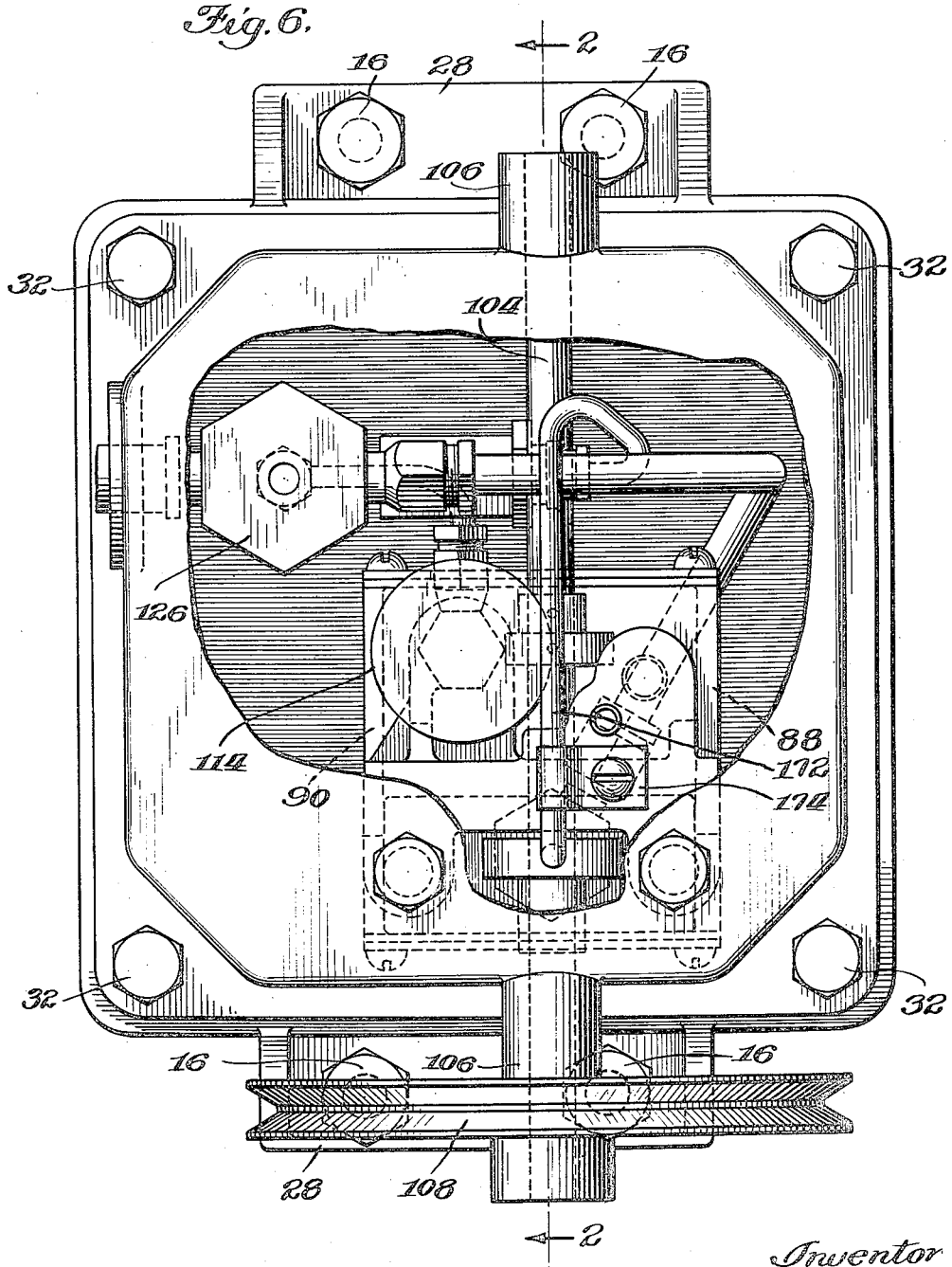

1,979,370

UNITED STATES PATENT OFFICE 1,979,370

LUBRICATING APPARATUS

Ernest W. Davis, Oak Park, Ill., assignor to Alemite Corporation, Chicago, Ill., a corporation of Delaware Application May 31, 1930, Serial No. 458,308

18 Claims. (Cl. 184—7)

My invention relates to lubricating apparatus and is more particularly concerned with an improved pump mechanism for use with a centralized lubricating system. The pump mechanism of my invention is primarily adapted for use upon industrial machinery having a large number of bearings to be lubricated, bearings that require lubricant at regular intervals and in different proportions. To accomplish this purpose lubricant charge measuring devices are employed at each of the bearings to segregate the desired amount of lubricant for each respective bearing.

It is an object of my invention to provide an improved automatic pump mechanism for use with a lubricating system of this type to lubricate a plurality of bearings.

A further object of my invention is to provide an improved pump of this type capable of forcing lubricant to the bearings intermittently under an extremely high pressure and relieving the pressure in the line during the intervening periods.

A further object of my invention is to provide an improved pump of this type having a pair of continuously operating pumps arranged to cooperate to force lubricant to the charge measuring devices at the bearings at regular intervals and under an extremely high pressure.

Still another object of my invention is to provide an improved pump of this type which is comparatively simple in construction, yet extremely rugged and durable, and which will not easily become out of order.

Other objects and advantages will readily be apparent from the following description, reference being had to the accompanying drawings, in which Fig. 1 is an elevational view of a lubricating system showing my improved pump and a plurality of charge measuring units of the type preferably employed with this pump and which are shown in cross-section;

Fig. 2 is a vertical sectional view of the pump taken on the line 2—2 of Fig. 1;

Fig. 3 is a vertical sectional view of the pump taken on the line 3—3 of Fig. 2, with the drive pulley omitted;

Fig. 4 is a fragmentary sectional view showing the cam and upper end of the plunger mechanism and is taken on the line 4—4 of Fig. 3;

Fig. 5 is a similar fragmentary sectional view showing another cam and upper end of a plunger and is taken on the line 5—5 of Fig. 3; and Fig. 6 is a plan view of the pump with the cover partially broken away to show other parts.

In the drawings (Fig. 1) 10 represents a machine having a plurality of moving parts and bearings to be lubricated. A pair of these bearings 12, 12, are shown supporting shafts 14, 14. A combined pump and reservoir unit "A" is shown mounted in a convenient place on the machine 10 and rigidly attached thereto by bolts 16.

A lubricant conduit 18 extends from unit A to measuring chambers located adjacent each bearing to be lubricated, and a pair of which B and C, are shown in the drawings associated with bearings 12, 12.

Measuring units B and C are of the general type shown in the application of George R. Ericson and Phillip R. Wheeler, filed June 15, 1929, serial number 371,244, and will not be described herein in any great detail. Generally speaking, these measuring units comprise a body member 19 containing a resilient storage chamber 20 having a movable wall 22 therein, and a flexible valve 24 normally closing an inlet port, adapted when lubricant is pumped against it under pressure to flex and allow the lubricant to pass into chamber 20, and adapted upon relief of the pressure to close the inlet and flex in the opposite direction to allow lubricant to flow from chamber 20 under the pressure of spring 23 to the bearing to be lubricated.

Referring now more particularly to the pump and reservoir unit, I provide a hollow base casting 26 having lugs 28 through which the bolts 16 pass to secure the unit to the machine 10. An inverted cup-shaped cap member 30 rests upon the top of base 26 and is fastened thereto by means of capscrews 32. A pair of pump mechanisms 34 and 36 (Fig. 3) are provided, one of which, 34, is adapted to pump lubricant to the bearings, and the other, 36, is adapted to pump lubricant to a control device hereinafter to be described. Both of the pump mechanisms are carried by a unitary frame member 38 which is bolted to the under side of cap member 30.

As most clearly shown in Fig. 3, each pump unit comprises a plunger 40 engaged by an enlarged stem 42 guided in a pair of lateral flanges 44 and 46 of the frame member 38. The plunger 40 of pump 34 is reciprocated in the vertical bore 48 of a cylinder block 50 which is screw-threadedly mounted in a lower lateral flange 52 of the frame 38. A pair of inlet ports 54 in the cylinder block communicated with bore 48. A spring-pressed valve 56 which normally closes the lower end of bore 48 is located in an enlarged chamber 58 in the cylinder block 50 and the lower end of this chamber is closed by a screw plug 60.

Conduit 62 is connected to the cylinder block 50 by a connector bushing 64 and is in communication with chamber 58 through opening 66. A cap member 68 is attached to the upper end of plunger 40 on a reduced end thereof and contacts the stem 42. A spring 112 arranged between cap 68 and flange 52 holds the plunger 40 in engagement with the enlarged stem 42.

Pump 36 is generally similar to pump 34, being provided, however, with a plunger 41 of a relatively small diameter which reciprocates in a bore 70 in cylinder block 72. A slotted opening 74 through one wall of the cylinder block provides an inlet port to the bore 70 which is closed at its lower end by a ball check valve 76 located in an enlarged chamber 78 in the lower end of block 72. The cylinder block is screw-threadedly mounted in a supporting member 80 which has a reduced end portion secured in a tapped bore 82 in flange 52. A conduit 86 is in communication with opening 79 and chamber 78, being connected to member 80 by a connector bushing 84.

A pair of vertical side walls 88, 90 connect flanges 46 and 52 of the frame, leaving substantially rectangular openings in the frame casting 38 covered with strainers 92, 94 through which the lubricant must pass to reach the pumps 34 and 36. Each of these strainers preferably comprises a wire mesh screen 96 supported by a pair of rectangular frame members 98 and fastening screws 99.

Pumps 34 and 36 may be actuated in a number of different ways and in the embodiment of the invention shown in the drawings a pair of cams 100 and 102 are shown pinned to a drive shaft 104. Shaft 104 is journalled in a pair of bearings 106 in cap 30 and extends from the cap at one end where a pulley 108 is mounted thereon. Pulley 108 is driven through a belt 110 from any rotating part of the machine 10, such part being determined from the particular construction and lubrication requirements of the particular machine upon which unit A may be mounted.

As more clearly shown in Fig. 5, cam 100 is an eccentric situated above the upper end of plunger stem 42 of pump 34, and as it rotates forces plunger 40 down in bore 48, and spring 112, situated between cap 68 and flange 52, forces plunger stem 42 upward and also raises plunger 40 in bore 48.

Pump 36 is shown as a gravity-operated pump, plunger stem 42 having a disk 114 secured to its top end and engaged by cam 102. The cam raises the plunger stem and permits spring 116, positioned between flange 52 and a cup-like cap 118 attached to the top of plunger 70, to raise the plunger in the cylinder block 72. As the cam revolves, disk 114 drops from the edge 103 of the cam and urges plunger 70 downward. Means for adjusting the length of this stroke is provided in the form of a limit stop member 120 screw-threadedly supported in cover 30.

The position of the stop member may be varied by loosening lock-nut 122 and inserting a screw-driver in slot 124 and moving the stop member up or down.

As previously mentioned, pump 34 will force lubricant into conduit 62, which conduit extends from cylinder block 50 to the head member 126 of a valve control cylinder 128, being connected thereto by a suitable connector-bushing 130. Lubricant discharge conduit 18 extends through a wall of cover 30 and is attached to head member 126, suitable lock-nuts and bushings being provided where the conduit passes through the wall of cover 30. As thus far described, it will be obvious that lubricant under pressure will be continuously pumped to the upper end of the control cylinder 128.

Pump 36 is connected through conduit 86 with a lower cap member 132 of cylinder 128 by a suitable connector bushing 134. A reciprocable piston 136 is mounted in the control cylinder 128 and comprises generally a cylindrical body member 138 having a reduced internally threaded upper end 140. An inverted cup-leather washer 142 is positioned over end 140. A retaining member 144 holds washer 142 in position and also provides a mounting means for a turned-up cup-leather washer 146. This washer is locked in position by a lock member 148.

A chamber 152 in body member 138 is closed at its lower end by a plug member 150. A valve 154 is positioned in chamber 152 and extends upward through an aperture 156 in retaining member 144. The upper end of the valve is hemispherically shaped to close an outlet 158 in the upper wall of head 126. Valve 154 has a reduced threaded lower end 160 upon which a flanged member 162 is secured. A spring 164 is carried by the flanged member.

A valve housing 166 is screw-threadedly mounted in a tapped hole 168 in lower cap member 132. Valve housing 166 is generally cylindrical in shape. A spring-pressed ball check 167 is mounted in valve housing 166, normally closing valve port 169. Spring 171 bears against a connector bushing 170 attached to one end of valve housing 166, from which a conduit 172 extends to the upper part of frame 38. The conduit 172 is securely fastened to frame 38 by a retaining clip 174 and has an open end 176 directly over eccentric cam 100, to lubricate the latter and its associated mechanism.

In operation my improved pumping device may be located upon an industrial machine that has bearings to be lubricated and which has a moving element adapted to drive shaft 104 by means of belt 110 and pulley 108. The two pumps in reservoir A will thus be continuously operated through the medium of cams 100 and 102. Assuming that the hollow base casting 26 is filled with lubricant, it will be evident that pump 34 will discharge lubricant through conduit 62 into the upper end of control cylinder 128, and pump 36 will force a smaller quantity of lubricant into the lower end of cylinder 128. Lubricant pumped into the upper end of the cylinder may escape through opening 158 but as lubricant is forced into the lower end of the cylinder piston 136 will gradually be raised until valve 154 closes the outlet 158 in the upper end of the reservoir. At this time lubricant being pumped through conduit 62 will be forced out through conduit 18 to the various charge measuring devices, such for example as B and C. Due to the fact that the lubricant is being pumped under an extremely high pressure lubricant will be forced into the reservoirs of the measuring valves and completely fill them.

When all of the measuring valves have been completely charged the pressure in the conduits will rapidly build up since the pump 34 continues operation. When the pressure attained is sufficient to overcome the force of the spring pressed relief valve 167 the piston 136 will be forced downwardly until the piston through the spring 164 exerts a sufficiently great downwardly directed force upon the valve 154 to remove the latter from its seat. When the valve is slightly opened the pressure in the upper end of the control cylinder will be relieved and the spring 164 rapidly snap the valve away from the opening 158 and permit relief of the pressure in the conduit system.

As soon as the pressure in the upper end of the control cylinder is thus relieved the piston will temporarily come to rest and the relief valve 167 again forced against its seat. Pump 34 will continue operation but its entire discharge will be by-passed through the opening 158. The pump 36 operates continuously to force lubricant into the lower end of the control cylinder at a relatively slow rate. Lubricant thus applied to the lower end of the cylinder slowly raises the piston 136 in the control cylinder until the valve 154 is again forced against its seat at the opening 158, whereupon the cycle of operation above described is repeated.

Conduit 172 extends upwardly from the valve and is adapted in the present embodiment to allow the lubricant forced therethrough to flow upon cam 100, thereby oiling the cam and its associated parts. Some of the lubricant dropped upon the cam will flow down along plunger stem 42, thus lubricating the apertures in flanges 44 and 46 to eliminate any possible friction at these bearing parts.

From the foregoing detailed description of the operation of my improved apparatus, it will be apparent that a certain sequence of operations will take place at predetermined timed intervals. First, the pump 34 will operate ineffectively merely to discharge oil through the outlet port 158 and there will be no pressure upon the conduit system. Second, when the pump 36 has completely filled the lower end of the reservoir of the controlling device and the valve 154 has closed the port 158, lubricant will be forced under pressure to the conduit system and fill the resilient reservoirs of the measuring valves at the bearings. As soon as all of these reservoirs are filled and the pressure built up sufficiently to overcome the compression of the spring which tends to hold the ball valve 167 upon its seat, the controlling valve assembly 136 will be forced downwardly and open the valve 158, thus relieving the pressure upon the entire conduit system and permitting the resilient reservoirs of the measuring valves to force the lubricant contained therein to their respective bearings. The valve assembly 136 will always move downwardly a predetermined distance before the valve 154 is unseated and it will therefore require a predetermined number of strokes of the pump 36 to again force enough lubricant into the lower end of the valve control cylinder to raise the valve assembly and again close the port 158. Thus, by controlling the length of the stroke of the pump plunger 70 (by adjustment of the member 120), the frequency of operation of the valve, and hence the frequency of lubrication of the bearings, may readily be controlled.

When the apparatus of my invention is directly connected to a normally moving part of the machine to be lubricated it will of course be apparent that the bearings will be supplied with lubricant in accordance with the speed and time of operation of the machine.

It will be apparent that changes and modifications may be made in the details of construction and I do not wish to be limited to the precise details of construction set forth, but desire to avail myself of all changes within the scope of the appended claims. In some of the claims the words "upper" and "lower" are used solely to designate the relative positions of the parts and are not to be literally construed.

I claim as my invention:

1. A pump mechanism for lubricant comprising a reservoir, a supply line extending therefrom, a closure cap, a pump-supporting frame formed integral with said closure cap, two pumps mounted in said reservoir carried by said frame, conduits extending from said pumps, a control cylinder, a top and a bottom cap therefor, a conduit extending from one pump to the bottom cap and a conduit extending from the other pump to the top cap, said top cap having an overflow outlet therein, a reciprocable piston in the control cylinder, and a valve member operated periodically thereby for closing said overflow outlet to allow lubricant under pressure to be pumped to the supply line.

2. A centralized lubricating system comprising a reservoir, a pump supplied with lubricant from said reservoir, means for operating said pump, a discharge conduit connected to said pump, a passageway leading from said discharge conduit to said reservoir, a valve for closing said passageway, and means for controlling the operation of said valve, said means being operable to open said valve upon a predetermined pressure in said conduit and to close said valve at a predetermined time after it has been opened.

3. A centralized lubricating system comprising a reservoir, a pump supplied with lubricant from said reservoir, means for operating said pump, a discharge conduit connected to said pump, said discharge conduit having a passageway leading therefrom to said reservoir, a valve for closing said passageway, and hydraulic means for controlling the operation of said valve, said means being operable to open said valve when a predetermined lubricant pressure is attained in said conduit and to close said valve a predetermined time interval after it has been opened.

4. A centralized lubricating system for a machine having a plurality of bearings, interconnected conduits for conveying lubricant to said bearings, a plurality of measuring valves, one associated with each of said bearings to apportion the lubricant conveyed through said conduits among said bearings, a lubricant reservoir, a control pump, a pumping mechanism for forcing lubricant from said reservoir into said conduits, a by-pass from said conduits to said reservoir, a valve for closing said by-pass, and means for operating said valve comprising a cylinder having one end communicating with said conduits, a piston in said cylinder having a lost motion connection with said valve, a resiliently held valve closing the other end of said cylinder, and means including said control pump to supply lurbicant to said last named end of said cylinder at a substantially constant rate, said valve operating means being actuated by the lubricant discharged by said control pump to close the valve and being actuated by the lubricant pressure supplied from said pumping mechanism to open said valve when the lubricant pressure in the discharge conduits attains a predetermined value.

5. A centralized lubricating system for a machine having a plurality of bearings, interconnected conduits for conveying lubricant to said bearings, a plurality of measuring valves, one associated with each of said bearings to apportion the lubricant conveyed through said conduits among said bearings, a lubricant reservoir, a control pump, pumping mechanism for supplying lubricant from said reservoir to said conduits, said conduits being provided with a by-pass to said reservoir, a valve for closing said by-pass, and means for operating said valve comprising a cylinder having one end communicating with said conduits, a piston in said cylinder having a lost motion connection with said valve, a resiliently held check valve closing the other end of said cylinder, and an adjustable stroke pump to supply lubricant to said last named end of said cylinder at a substantially constant rate throughout the period of operation of said pumping mechanism, said valve operating means being actuated by the lubricant discharged by said control pump to close the valve and being actuated by the lubricant pressure supplied from said pumping mechanism to open said valve when the pressure in the discharge conduits attains a predetermined value.

6. A centralized lubricating system for a machine having a plurality of bearings, interconnected conduits for conveying lubricant to said bearings, a plurality of measuring valves, one associated with each of said bearings to apportion the lubricant conveyed through said conduits among said bearings, a lubricant reservoir, pumping mechanism for forcing lubricant from said reservoir into said conduits, and control means operable intermittently to relieve the pressure in said conduits, said means comprising a valve controlled by-pass from said conduits to said reservoir, means to open said by-pass upon predetermined lubricant pressures in said conduits, and continuously operating means to close said by-pass.

7. A centralized lubricating system for a machine having a plurality of bearings, interconnected conduits for conveying lubricant to said bearings, a plurality of flow controlling devices, one associated with each of said bearings to apportion the lubricant conveyed through said conduits among said bearings, a lubricant reservoir, pumping mechanism for supplying lubricant from said reservoir to said conduits, and control means operable intermittently to relieve the pressure in said conduits when the pressure therein exceeds a predetermined maximum, said means comprising a valve controlled by-pass from said conduits to said reservoir, hydraulically actuated means to open said by-pass, and hydraulic means operative to close said by-pass after it has been open for a predetermined elapsed time interval.

8. A centralized lubricating system for a machine having a plurality of bearings, interconnected conduits for conveying lubricant to said bearings, a plurality of measuring valves, one associated with each of said bearings to apportion the lubricant conveyed through said conduits among said bearings, a lubricant reservoir, pumping mechanism for forcing lubricant from said reservoir into said conduits, a port forming a bypass from said conduits to said reservoir, a valve for closing said port, a piston having one side thereof exposed to the pressure of the lubricant in said conduits, a lost motion connection between said piston and said valve, a cylinder for said piston having a pressure relief means at its lower end, said pressure relief means opening at a pressure less than that at which said valve is opened, and means to supply lubricant under pressure to the lower end of said cylinder at a slow rate continuously during the operation of said pumping mechanism.

9. A centralized lubricating system for a machine having a plurality of bearings, interconnected conduits for conveying lubricant to said bearings, a plurality of flow controlling devices, one associated with each of said bearings and operable to apportion the lubricant conveyed through said conduits among said bearings, a lubricant reservoir, pumping mechanism for supplying lubricant from said reservoir to said conduits, said conduits having a port forming a by-pass therefrom to said reservoir, a valve for closing said port, a piston having the upper side thereof exposed to the pressure of the lubricant in said conduits, a resilient lost motion connection between said piston and said valve, a cylinder for said piston having a pressure relief valve at its lower end, said relief valve opening at a pressure less than that at which said first-named valve is opened, and means for supplying lubricant under pressure to the lower end of said cylinder at a slow rate continuously during the operation of said pumping mechanism.

10. In a centralized lubricating system having a conduit system for supplying lubricant to a plurality of bearings, a control device comprising a cylinder having a piston freely reciprocable therein, the upper end of said cylinder being connected to said conduit system and having an opening therein, means for supplying lubricant under relatively high pressure to the upper end of said cylinder, a valve cooperable with said opening to close the same, a lost motion connection between said piston and said valve, a pressure relief valve connected to the lower end of said cylinder, and means for supplying lubricant under relatively low pressure to the lower end of said cylinder at a relatively slow rate continuously during the operation of the lubricating system, said piston being moved by the lubricant in the upper end of said cylinder, when said lubricant attains a predetermined pressure, for opening said pressure relief valve.

11. In a centralized lubricating system having a conduit system for supplying lubricant to a plurality of bearings, a control device comprising a cylinder having a piston freely reciprocable therein, the upper end of said cylinder being connected to said conduit system and having an opening therein, means for supplying lubricant under relatively high pressure to the upper end of said cylinder, a valve to close said opening, a lost motion connection between said piston and said valve, a pressure relief valve connected to the lower end of said cylinder and discharging into said reservoir, and adjustable volume pump means for supplying lubricant under relatively low pressure to the lower end of said cylinder at a relatively slow rate continuously during the operation of the lubricating system, said piston being moved by the lubricant in the upper end of said cylinder, when said lubricant attains a predetermined pressure, for opening said pressure relief valve.

12. A lubricant flow control device comprising a cylinder having a piston freely reciprocable therein and an opening at the upper end thereof, a valve for closing said opening, an operative connection between said valve and said piston, means for connecting a lubricant supply conduit system to the upper end of said cylinder, a pressure relief valve connected to the lower end of said cylinder, and means to supply lubricant at a relatively slow rate to the lower end of said cylinder, said piston being moved by the lubricant in the upper end of said cylinder, when said lubricant attains a predetermined pressure, for opening said pressure relief valve.

13. A lubricant flow control device comprising a cylinder having a piston freely reciprocable therein, an opening at the upper end of said cylinder, a valve for closing said opening, a resilient lost motion connection between said valve and said piston, means for supplying lubricant under pressure to the upper end of said cylinder, means for connecting a lubricant supply conduit system to the upper end of said cylinder, a pressure relief valve connected to the lower end of said cylinder, and adjustable means to supply a fluid under pressure at a relatively slow rate to the lower end of said cylinder, said piston being moved by the lubricant in the upper end of said cylinder, when said lubricant attains a predetermined pressure, for opening said pressure relief valve.

14. A lubricant flow control device comprising a cylinder having a piston freely reciprocable therein and an opening in the upper end thereof, a valve for closing said opening, an operative connection between said valve and said piston, means for supplying lubricant under pressure to the upper end of said cylinder, means for connecting a lubricant supply conduit system to the upper end of said cylinder, a pressure relief valve connected to the lower end of said cylinder, means to supply lubricant at a relatively slow rate to the lower end of said cylinder, and adjustable means to control the rate at which lubricant is supplied to the lower end of said cylinder, said piston being moved by the lubricant in the upper end of said cylinder, when said lubricant attains a predetermined pressure, for opening said pressure relief valve.

15. A lubricant flow control device comprising a chamber having a movable wall separating said chamber into an upper and a lower portion, an opening in the upper portion, a valve for closing said opening, an operative connection between said valve and said wall, means for supplying lubricant under pressure to the upper portion of said chamber means for connecting a lubricant supply conduit system to said upper portion of said chamber, a pressure relief valve connected to the lower portion of said chamber, and means to supply a fluid under pressure at a relatively slow rate to said lower portion of said chamber, said movable wall being moved by the lubricant in the conduit end of said chamber, when said lubricant attains a predetermined pressure, for opening said pressure relief valve.

16. A lubricant flow control device comprising a chamber having a movable wall separating said chamber into an upper and a lower portion, an opening in the upper portion, a valve for closing said opening, an operative connection between said valve and said wall, means for supplying lubricant under pressure to the upper portion of said chamber means for connecting a lubricant supply conduit system to said upper portion of said chamber, a pressure relief valve connected to the lower portion of said chamber, means to supply a fluid under pressure at a relatively slow rate to said lower portion of said chamber, and adjustable means to control the rate at which fluid is supplied to the lower portion of said chamber, said movable wall being moved by the lubricant in the conduit end of said chamber, when said lubricant attains a predetermined pressure, for opening said pressure relief valve.

17. A centralized lubricating system for an industrial machine, including a lubricant reservoir, a plurality of bearings on the machine to be lubricated, measuring chambers at each bearing adapted to store a measured supply of lubricant, said reservoir containing a control cylinder, conduits connecting said measuring chambers with the upper end of said control cylinder, a high pressure pump and a low pressure pump in said reservoir driven from a moving element of the machine to be lubricated, the discharge of said high pressure pump being connected with the upper end of said control cylinder and the discharge of said low pressure pump being connected to the lower end of said control cylinder, and a valve in said control cylinder for causing the discharge of one of said pumps to flow into said conduits, said valve being opened by the lubricant in the control cylinder when under a predetermined pressure to permit the return of the lubricant being pumped to said control cylinder to the main reservoir.

18. A centralized lubricating system for an industrial machine, comprising a lubricant reservoir, a plurality of bearings to be lubricated, measuring chambers at each bearing adapted to store a measured supply of lubricant, said reservoir containing a control cylinder, conduits connecting said measuring chambers with said control cylinder, a high pressure pump and a low pressure pump in said reservoir, the discharge of said pumps being connected with said control cylinder at opposite ends thereof respectively, a valve in said control cylinder closed by the lubricant supplied by said low pressure pump for rendering effective the discharge of said high pressure pump into said conduit, and means operated by the pressure developed in said control cylinder by the lubricant discharged from said high pressure pump to open said valve upon attaining a predetermined pressure and thereby to permit return to said reservoir of the lubricant being pumped to said control cylinder by said high pressure pump.

ERNEST W. DAVIS.